(12) United States Patent
Nelson

(10) Patent No.: US 6,496,568 B1
(45) Date of Patent: Dec. 17, 2002

(54) METHOD AND APPARATUS FOR PROVIDING AUTOMATED NOTIFICATION TO A CUSTOMER OF A REAL-TIME NOTIFICATION SYSTEM

(75) Inventor: Donald R. Nelson, Boulder, CO (US)

(73) Assignee: Avaya Technology Corp., Basking Ridge, NJ (US)

(*) Notice: Subject to any disclaimer, the term of this patent is extended or adjusted under 35 U.S.C. 154(b) by 0 days.

(21) Appl. No.: 09/290,111

(22) Filed: Apr. 12, 1999

(51) Int. Cl.[7] .............................. H04M 1/64; H04M 3/42
(52) U.S. Cl. .................... 379/88.12; 379/79; 379/88.19; 379/201.01; 379/201.07; 379/207.12; 379/208.01; 379/209.01; 379/210.01
(58) Field of Search ........................... 379/67.1, 70, 72, 379/76, 88.12, 88.15, 88.22, 93.12, 93.17, 93.23, 170, 201, 203, 217, 262, 265, 79, 88.09, 88.11, 88.14, 88.19, 88.2, 88.21, 114.12, 114.13, 144.07, 144.08, 201.01, 201.07, 207.12, 208.01, 209.01, 210.01, 214.01; 705/5, 6

(56) References Cited

U.S. PATENT DOCUMENTS

| | | | | |
|---|---|---|---|---|
| 5,237,499 A | * | 8/1993 | Garback | 364/407 |
| 5,285,383 A | * | 2/1994 | Lindsey et al. | 364/408 |
| 5,757,904 A | * | 5/1998 | Anderson | 379/265 |
| 5,797,126 A | * | 8/1998 | Helbling et al. | 705/5 |
| 5,832,451 A | * | 11/1998 | Flake et al. | 705/5 |
| 5,948,040 A | * | 9/1999 | DeLorme et al. | 701/201 |
| 6,003,009 A | * | 12/1999 | Nishimura | 705/5 |
| 6,018,715 A | * | 1/2000 | Lynch et al. | 705/5 |
| 6,044,353 A | * | 3/2000 | Pugliese, III | 705/5 |
| 6,112,185 A | * | 8/2000 | Walker et al. | 705/5 |

* cited by examiner

Primary Examiner—Allan Hoosain
(74) Attorney, Agent, or Firm—Patton Boggs LLP

(57) ABSTRACT

An automated method and apparatus for notifying subscribers of a customer message manager notification system upon changes in some real-time data is disclosed. Subscribers are notified in an order based on some predetermined criteria, such as subscriber level. More specifically, airline customers are notified of changes in airline information which affects their travel plans, as well as other types of notification. This notification can occur via standard communications devices commonly carried by travels such as pagers, two-way pagers, cellular telephones (e.g., via automated voice, call centers), and mobile computers (e.g., via email or a web page). The present invention further provides for notifying selected groups of customers based on a predetermined criteria, such as frequent flyer level, class of service, or price of ticket. Moreover, the invention also provides for receiving a response from a notified customer to update the travel plans for those communications devices that support two-way communication. In this manner, selected groups or individual customers can be given preferential treatment.

20 Claims, 7 Drawing Sheets

EXEMPLARY OPERATING ENVIRONMENT
200

METHOD AND APPARATUS FOR PROVIDING AUTOMATED NOTIFICATION TO A CUSTOMER OF A REAL-TIME NOTIFICATION SYSTEM

FIELD OF THE INVENTION

This invention relates to computer and communications systems, and more particularly, to providing automated notification to subscribers of a notification system, including notifying airline customers upon some airline event.

BACKGROUND OF THE INVENTION

Airline travelers desire increased customer service for notification of changes in airline schedules and other airline events, and ease of making changes to their travel plans especially upon occurrence of a flight cancellation. Currently, travel customers are typically notified of airline schedule changes via a public address system and airport monitors, or by a customer service agent. In response to hearing the announcement or looking at an airport monitor, the travel customer then typically either goes to a ticket counter and waits in line for a ticket agent to make new travel plans, or initiates a telephone call to an airline agent.

Airline travelers desire reliable, faster, and better methods of receiving notification of airline schedule information which affects their travel, as well as easier methods for updating their travel plans. In addition, customers who are frequent customers of the airlines or paid for a higher priced ticket also desire increased levels of customer service.

SUMMARY OF THE INVENTION

According to the invention, an automated method and apparatus are provided for notifying subscribers in real-time based on some notification event, including notifying airline customers of changes in airline information which affects their travel plans, as well as other types of notification events. This notification can occur via standard communications devices commonly carried by travels such as pagers, two-way pagers, cellular telephones (e.g., via automated voice, call centers), and mobile computers (e.g., via email or a web page). The present invention further provides for notifying selected groups of customers based on a predetermined criteria, such as frequent flyer level, class of service, or price of ticket. Moreover, the invention also provides for receiving a response from a notified customer to update the travel plans for those communications devices that support two-way communication. In this manner, selected groups or individual customers can be given preferential treatment.

An embodiment of the present invention provides a customer message manager for notifying a set of subscribers based of relevant changes in information, the customer message manager performing the steps of: receiving a notification event from a real-time data system; determining the set of subscribers to provide notification of the received notification event; and initiating notification of the set of subscribers in the order identified by a predetermine criteria. In an embodiment, the predetermined criteria is a subscriber level identified with a particular customer; and preferably, a predetermined period of time is delayed between notification of the particular subscribers having different subscriber levels. An embodiment of the customer message manager provides notification is provided through email, paging, a web site, automated voice synthesis, interactive voice response, and/or a call center.

In an embodiment, the customer message manager further performs the steps of: receiving a subscriber response indicating a requested change to the real-time data system; and providing a change request to the real-time data system. Preferably, the predetermined criteria is a subscriber level identified with a particular customer; and a predetermined period of time is delayed between notification of the particular subscribers having different subscriber levels.

An embodiment of the present invention provides a customer message manager for notifying customers of airline information, the customer message manager which performing the steps of receiving a notification event from an airline system; determining a set of customers to provide notification of the received notification event; and initiating notification of the set of customers in the order identified by a predetermine criteria.

Another embodiment of the present invention provides a customer message manager for notifying customers of airline information, the customer message manager performing the steps of polling an airline system to received airline information; evaluating the received airline information to generate notification events; determining a set of customers to provide notification of the generated notification event; and initiating notification to the set of customers in the order identified by a predetermine criteria.

Yet, another embodiment of the present invention provides a customer message manager for notifying customers of airline information in response to a notification event and receiving a customer response for making a change to an airline system, the customer message manager performing the steps of determining a set of customers to provide notification of the notification event; initiating notification of the set of customers; receiving a customer response indicating a requested change to the airline system; and providing a change request to the airline system. The notification event can be received from the airline system; or the customer message manager can poll an airline system to received airline information, and then evaluate the received airline information to generate notification events.

Embodiments of the present invention provide for notifying customers based on a flight schedule event (e.g., a flight cancellation, a gate change, equipment change, alternate flight options, a flight delay or early arrival); a flight status event (e.g., boarding, last call, arrived, departed); a ticketing event (e.g., upgrades available, overbooking); marketing events (i.e., higher classes of service available for additional fees, incentives to change fights, advertisements).

In embodiments of the present invention, the predetermined criteria is a frequent flyer level, a ticket price level, or a ticket class identified with a particular customer. These notification events include, but is not limited to, flight schedule events, flight status events, ticketing events, and marketing events. The notification is provided through email, paging, a web site, automated voice synthesis, interactive voice response, a call center, or any other communications media or system as would be understood by one skilled in the art in keeping with the scope and spirit of the present invention.

BRIEF DESCRIPTION OF THE DRAWINGS

The appended claims set forth the features of the present invention with particularity. The invention, together with its advantages and as previously described, may be better understood from the following detailed description taken in conjunction with the accompanying drawings of which:

DETAILED DESCRIPTION OF THE PREFERRED EMBODIMENT

Figure 1:
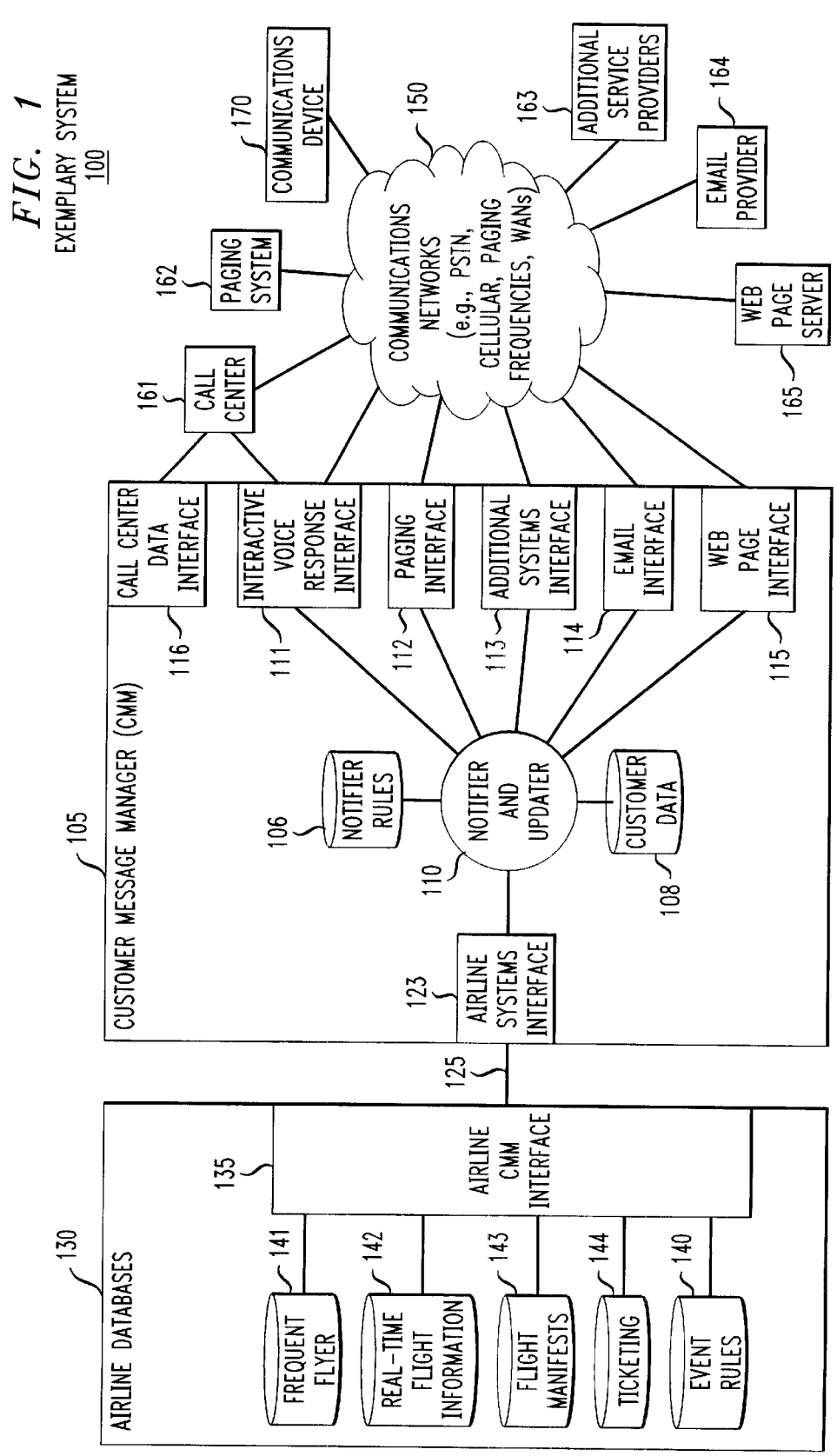
FIG. 1 is a block diagram of a exemplary system architecture embodying the present invention.
Figure 2:
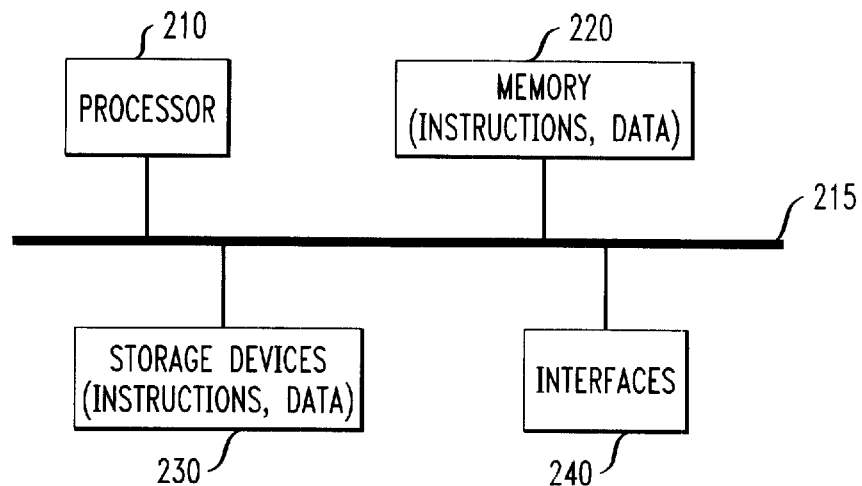
FIG. 2 is a block diagram of an exemplary operating environment in which the invention may be practiced.

FIGS. 1 and 2, and its discussion herein are intended to describe a description of a computing architecture and environment in which the present invention can be practiced. The present invention is not limited to the illustrated computing architecture and operating environment, nor to notification of airline systems events. Rather, the architecture and functionality of the present invention as taught herein and as would be understood by one skilled in the art is extensible to an unlimited number of configurations, embodiments, and applications requiring notification to customers, and possibly receiving customer instructions in response.

Turning now to FIG. 1, shown is a block diagram illustrating system architecture 100 for an embodiment of the present invention. Referring first to the center of FIG. 1, shown is the "Customer Message Manager" (CMM) 105. CMM 105 interfaces systems and their databases (e.g., airline databases 130) to receive or to generate notification events which then cause appropriate messages to be sent to customers (e.g., airline customer device 170).

CMM 105 comprises a notifier and updater system 110, which in one embodiment of the present invention, is the computing engine that drives the determination of which events require customer notification, and then commences the notification process. Notifier and updater system 110 uses a set of notifier rules 106 in making this determination, and stores customer data in database 108. For example, notifier rules 106 define upon occurrence of a predetermined event, the action that is to be taken. If, for example, the notifier and updater system 110 receives a flight cancellation event, notifier and updater system 110 can then query the airline databases 130 to determine what passengers are on the canceled flight, and then initiates the order of notification to the affected customers based on some criteria (e.g., frequent flyer status, price of ticket) to determine the order of their notification. Notifier and updater system 110 interfaces airline databases 130 via airline systems interface 123 over some communication medium 125 such as a wide area network, local area network, or other communication facility.

Once notifier and updater system 110 identifies a notification event and has determined the set of customers to notify, notifier and updater system 110 proceeds with the notification. Customers can be notified via an unlimited number of mechanisms, including interactive voice response messages over the telephone network, pages over a paging or cellular network, email, or even make such notification available at a web site should the customer want to check the status of some event.

CMM 105 provides the notification using interfaces 111–115. First, interactive voice response interface 111 provides computer voice response messages to customers; or automatically passes control information about the call to a call center 161 via call center data interface 116, dials the associate customer telephone number, and transfers the call upon answer to a call center 161.

CMM 105 provides a control interface 116 to a call center over which specific customer data can be transferred, allowing the call center agent to know details about the customer and the service being given the customer when the customer is connected to the agent.

Paging interface 112 communicates over communications networks 150 to a paging system 162. Paging system 162 is a standard system provided by a paging vendor. Upon receipt of a paging request, paging system 162 initiates the page over its paging frequencies (a part of communications networks 150) which is received by an airline customer device 170. If two-way paging is provided, the airline customer device can respond to the page and provide a selection of possible actions to be taken. For example, if a customer is notified of a canceled flight via a two-way paging system, the customer could select from a list of available alternative flights. This response would then be communicated from airline customer device 170 to paging system 162, to paging interface 112, to notifier and updater system 110. Notifier and updater system 110 could then interface to the airline systems to request or make the desired changes.

Similarly, email interface 114 provides notification via email over communications networks 150 to a customer email provider 164. Web page interface 115 communicates with web page server 165 over communications networks 150. In keeping with the scope and spirit of the present invention as disclosed herein, any number of notification mechanisms can be used to reach the customer. FIG. 1 illustrates this principal by showing additional system interface 113 which communicates with an additional service providers 163 to provide notification to the airline customer device 170.

Airline databases 130 represent airline reservation systems and other databases maintained by an airline or their representatives. These databases include frequent flyer 141, real-time flight information 142, flight manifest 143, and ticketing 144. The present invention is extensible, and provides for interfacing other databases and systems to access the desired and additional information. By accessing additional airline data, the present invention can provide notification for additional events.

In one embodiment of the present invention, CMM 105 receives notification event messages indicating some event that require the notification of one or more customers. Airline CMM interface 135 provides this functionality based on event rules 140. Similar to notifier rules 106 for the notifier and updater system 110, event rules 140 provides the information necessary for airline CMM interface 135 to determine what changes in the airline databases 141–144 require customer notification. In an embodiment of the present invention, rather than receiving notifier events or in addition to receiving notifier events, CMM 105 polls airline databases 130, and then based on notifier rules 106, notifier and updater system 110 determines what events require customer notification, and then proceeds with the notification.

Turning now to FIG. 2, shown is a block diagram illustrating an embodiment of an exemplary operating environment 200 for the Customer Message Manager (CMM) 105 (FIG. 1). Illustrated are processor 210, memory 220, storage devices 230, and interfaces 240 which are electrically coupled via bus 215. Memory 220 is one type of computer-readable medium, and typically comprises random access memory (RAM), read only memory (ROM), integrated circuits, and/or other memory components. Memory 220 typically stores computer-executable instructions to be executed by processor 210 and/or data which is manipulated by processor 210. Storage devices 230 are another type of computer-readable medium, and typically comprise disk drives, diskettes, networked services, tape drives, and other storage devices. Storage devices 230 typically store computer-executable instructions to be executed by processor 210 and/or data which is manipulated by processor 210. Interfaces 240 comprise interfaces to other peripheral devices, and external interfaces such as interfaces 111–116 and 123 illustrated in FIG. 1.

Figure 3A:
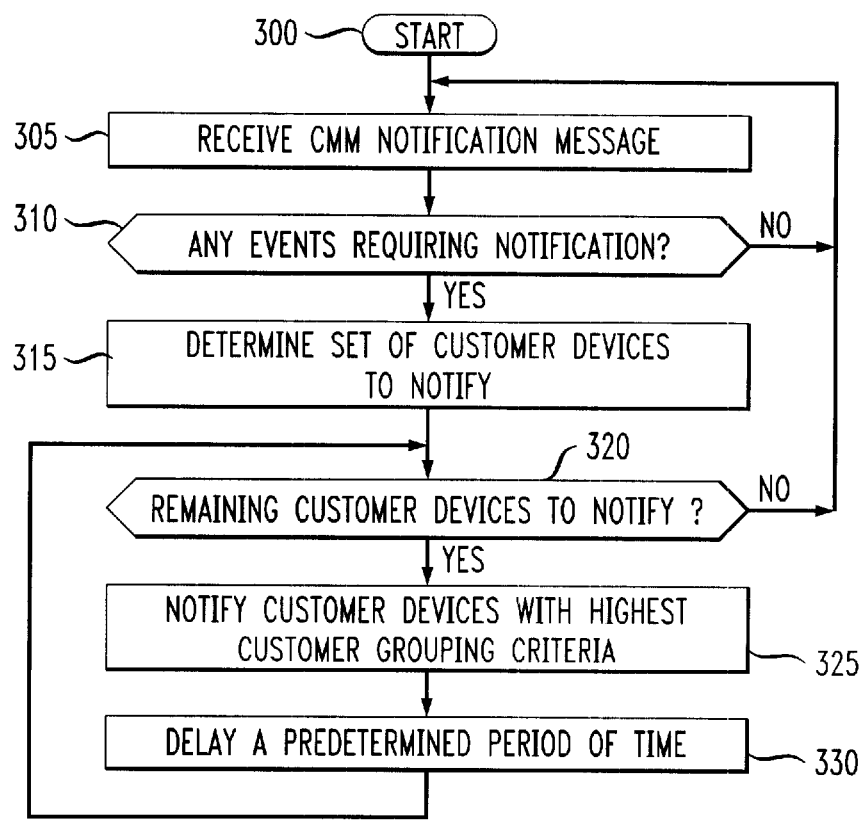
FIG. 3A is a flow diagram illustrating the steps performed in an embodiment of the present invention wherein the customer message manager is notified of potential events in which action is required.

Turning now to FIG. 3A, illustrated is a flow diagram for the processing of an embodiment of CMM 105 (FIG. 1). Processing begins at step 300 and proceeds to step 305 where CMM 105 receives a notification message. This notification message represents some event identified within the airline system possibly requiring notification to the customer. If it is an event requiring notification as determined in step 310, CMM 105 determines the set of customer devices to which notification is required in step 315. Otherwise, if no events requiring notification have been identified in step 310 processing returns to step 305. After step 315 has been performed, as long as there are customer devices remaining to be notified as determined in step 320, step 325 is performed to notify customer devices. The order of notification of these customer devices is based on some programmable grouping criteria, such as frequent flyer status, price of ticket, etc. Thus, the customer devices within the highest customer grouping criteria would be notified first. Then, after some predetermined delay period as represented by step 330, processing would continue to step 320 to determine if there are more customer devices remaining to be notified. When there are no more customer devices to notify, processing of FIG. 3A returns to step 305.

Figure 3B:
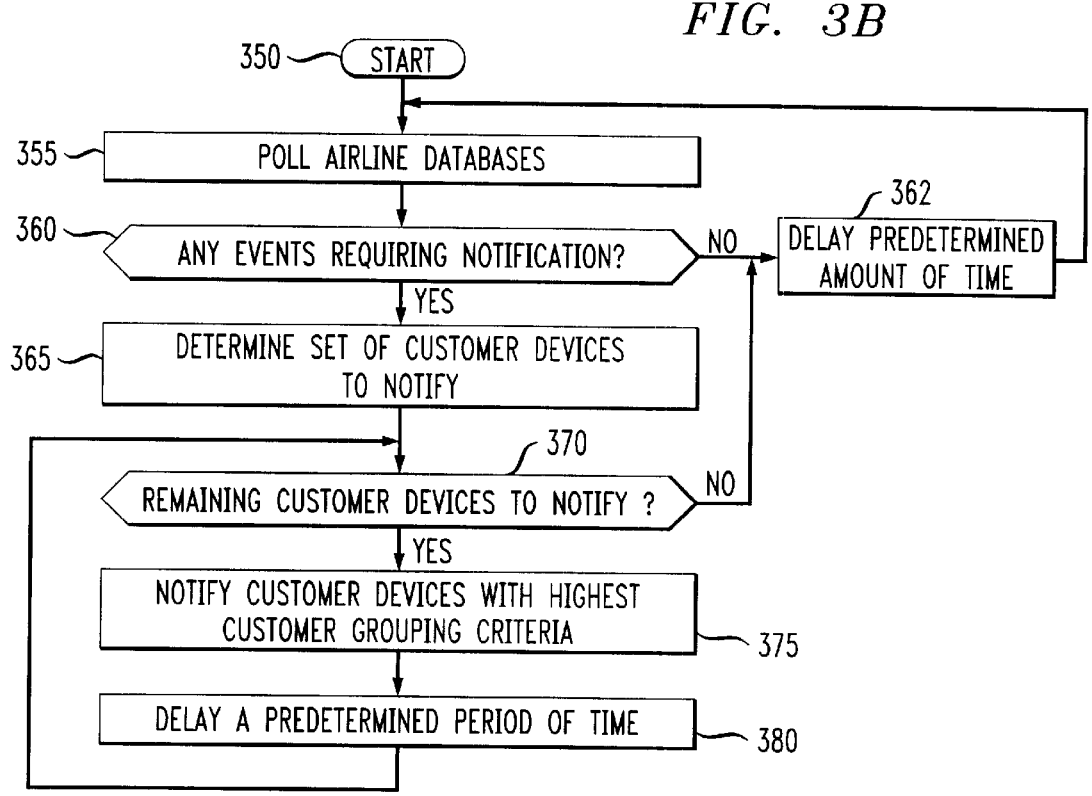
FIG. 3B is a flow diagram illustrating the steps performed in an embodiment of the present invention wherein the customer message manager polls airline databases to determine events in which action is required.

FIG. 3B represents an embodiment of the present invention in which CMM 105 polls the airline databases 130 (step 355) to determine whether any events have occurred which require notification as determined in step 360. If no events require notification, step 362 is performed to delay some predetermined amount of time, then processing returns to step 355. When new events are identified which require notification as determined in step 360, step 365 is performed to determine the set of customer devices to which notification is required. Then, as long as there are customer devices remaining to be notified as determined in step 370, step 375 is performed to notify the customer devices with the highest customer grouping criteria. Then, step 380 is performed to delay predetermined amount of time, which allows the customer in the highest customer grouping to receive notification and take any desired action. Then, processing returns to step 370 to notify the remaining devices. When all devices have been notified as determined in step 370, step 362 is performed to delay a predetermined amount of time, and processing returns to step 355.

Figure 4:
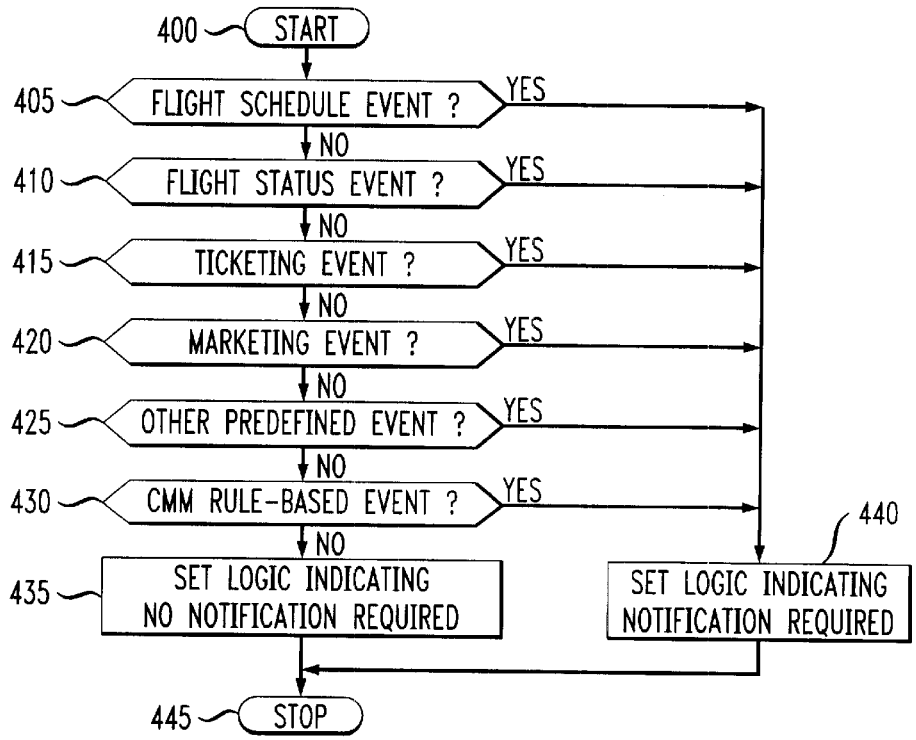
FIG. 4 is a flow diagram illustrating steps performed in determining whether action is event requires action.

FIG. 4 illustrates possible events which might require notification in accordance with the presentation. The flow diagram of FIG. 4B represents a case statement for identifying notification events. Processing begins with step 400, and proceeds through the case statement illustrated by steps 405–445. The determination of whether an event requires notification could be processed by airline CMM interface 135 and/or the notifier and updater system 110.

Beginning with step 400 processing continues to step 405 where the airline information is manipulated to determine whether there is a flight schedule event requiring notification, such as a change in gate, a flight cancellation or a flight delay. Upon determination of any event, step 440 is performed to set logic indicating an event requiring possible notification has been identified. Step 410 represents the determination of whether a flight status event has occurred which possibly requires notification, such as arrival at a gate, boarding of the flight has begun, or even last call for boarding the flight. Next, step 415 represents whether some ticketing event has occurred, such as first class seats are available on a current flight, upgrade seats are available etc. Step 420 represents whether a marketing event has occurred. Step 425 represents whether some other predefined event has occurred, as the present invention is extensible to other types of events and for other applications. Step 430 represents whether some CMM rule-based event has occurred as the present invention provides for dynamic adjustment and extensibility of notification events.

If no event required notification has been identified in steps 405–430, logic is set in step 435 indicating no notification is required. After step 435 or 440 is performed processing of FIG. 4 ceases as indicated by step 445.

Figure 5A:
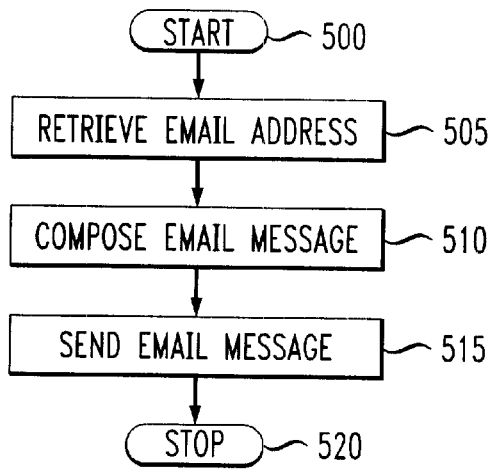
FIG. 5A is a flow diagram illustrating steps performed in providing notification via email.
Figure 5B:
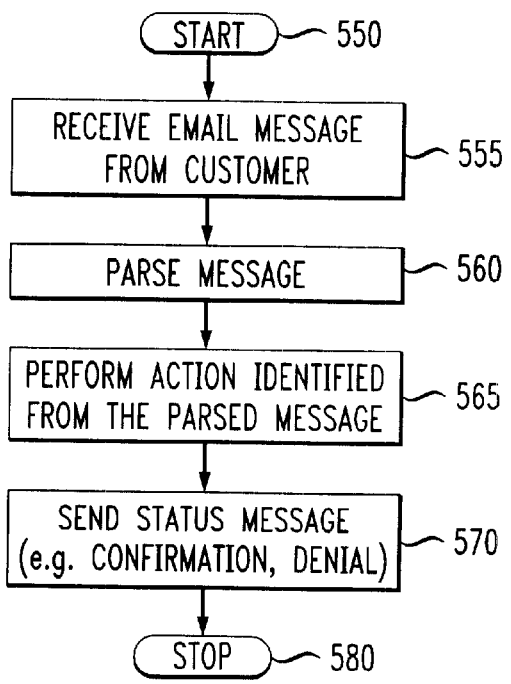
FIG. 5B is a flow diagram illustrating steps performed in receiving a response to a notification via email.

Turn now to FIGS. 5A–B, illustrated are flow diagrams representing processing by email interface 114 (FIG. 1). First, in FIG. 5A, processing begins at step 500. Then the email address of the desired customer is retrieved. Step 505, the email message is composed (step 510), and sent (step 515), and processing ends with step 520.

FIG. 5B represents receiving a response via email from a customer. Processing begins at step 550. Email is received from the customer (step 555), the message is then parsed (step 560), the action identified from the parsed message is performed (step 565), and a status message is returned to the customer in step 570 as either confirmation of denial of the action taken in a previous step. Processing then ceases with step 580.

Figure 6A:
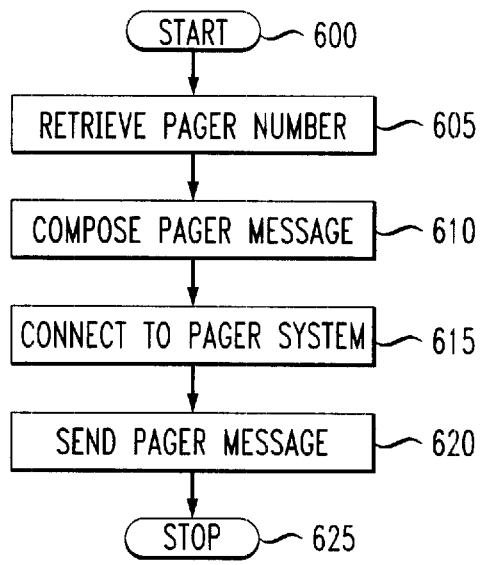
FIG. 6A is a flow diagram illustrating steps performed in providing notification to a pager.
Figure 6B:
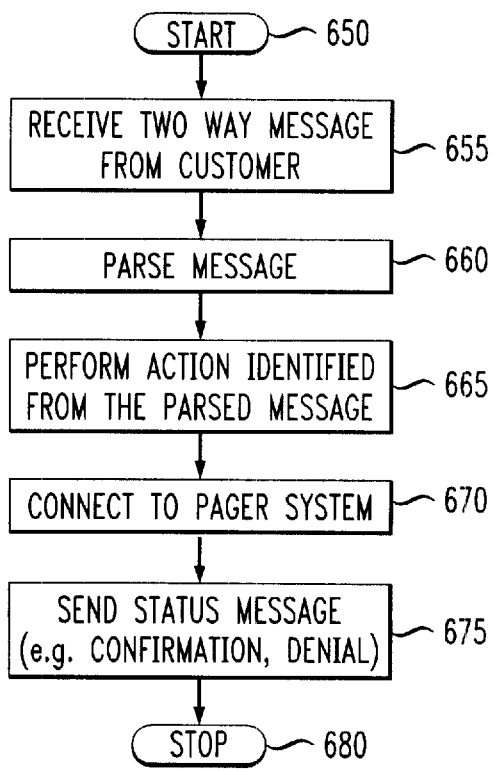
FIG. 6B is a flow diagram illustrating steps performed in receiving a response to a notification via a two-way pager.

Turning now to FIGS. 6A–B, illustrated are steps performed by the paging interface 112 (FIG. 1). Beginning with FIG. 6A, illustrated are the steps performed in notifying a customer using a pager. Processing begins in step 600, then the pager number is retrieved (step 605), the pager message is composed (step 610), CMM 105 (FIG. 1) connects to the pager system (step 615), the pager message is sent (step 620), and processing ceases with step 625.

Turn now to FIG. 6B, illustrated as steps for receiving a two-way paging message and its processing. First, processing begins at step 650. Then, a two-way paging message is received from a customer (step 655), the received message is parsed (step 660), the action identified from the parsed message is performed (step 665), CMM 105 (FIG. 1) connects to the pager system (step 670), and a status message is returned to the customer (step 675) indicating a confirmation or denial of the action. Processing ceases with step 680.

Figure 7A:
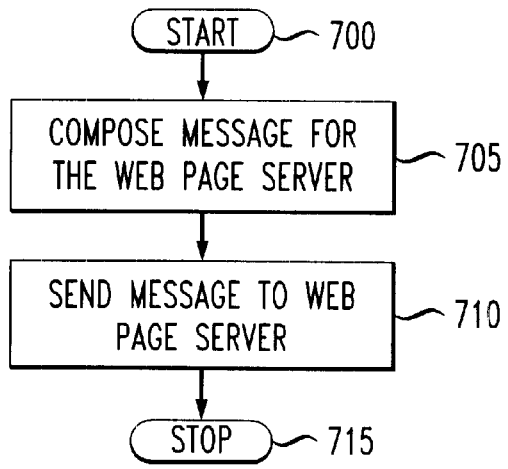
FIG. 7A is a flow diagram illustrating steps performed in providing notification via a web site server.
Figure 7B:
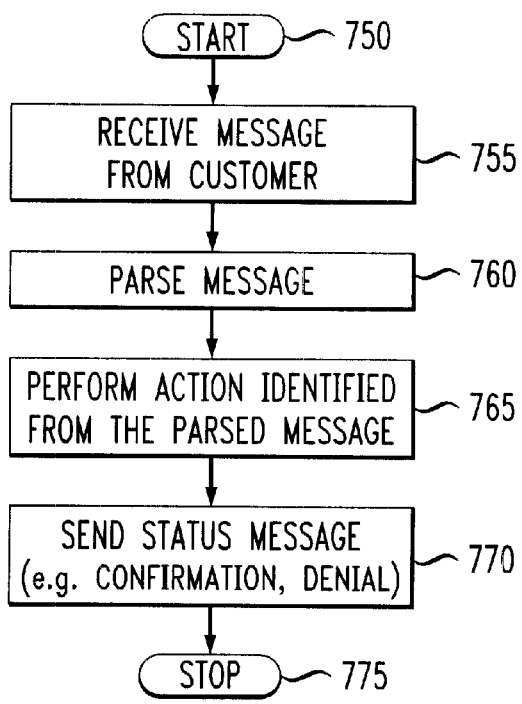
FIG. 7B is a flow diagram illustrating steps performed in receiving a response to a notification via a web site server.

Next, FIGS. 7A–B illustrate the processing of the present invention using a web page. First, FIG. 7A illustrates the steps for sending a notification to a web page server for review by a customer. Beginning with step 700, the message is composed for sending to the web page server (step 705), then the message is sent to the web page server (step 710), and processing ceases with step 715.

Next, FIG. 7B illustrates the steps taken in response to receipt of a customer request via a web page. Processing begins with step 750, then, the customer message is received (step 755), the message is parsed (step 760), the action identified in the parsed message is performed (step 765), a status message is returned to the customer confirming or denying the performance of the action identified in the previous step (step 770), and processing ceases with step 775.

Figure 8:
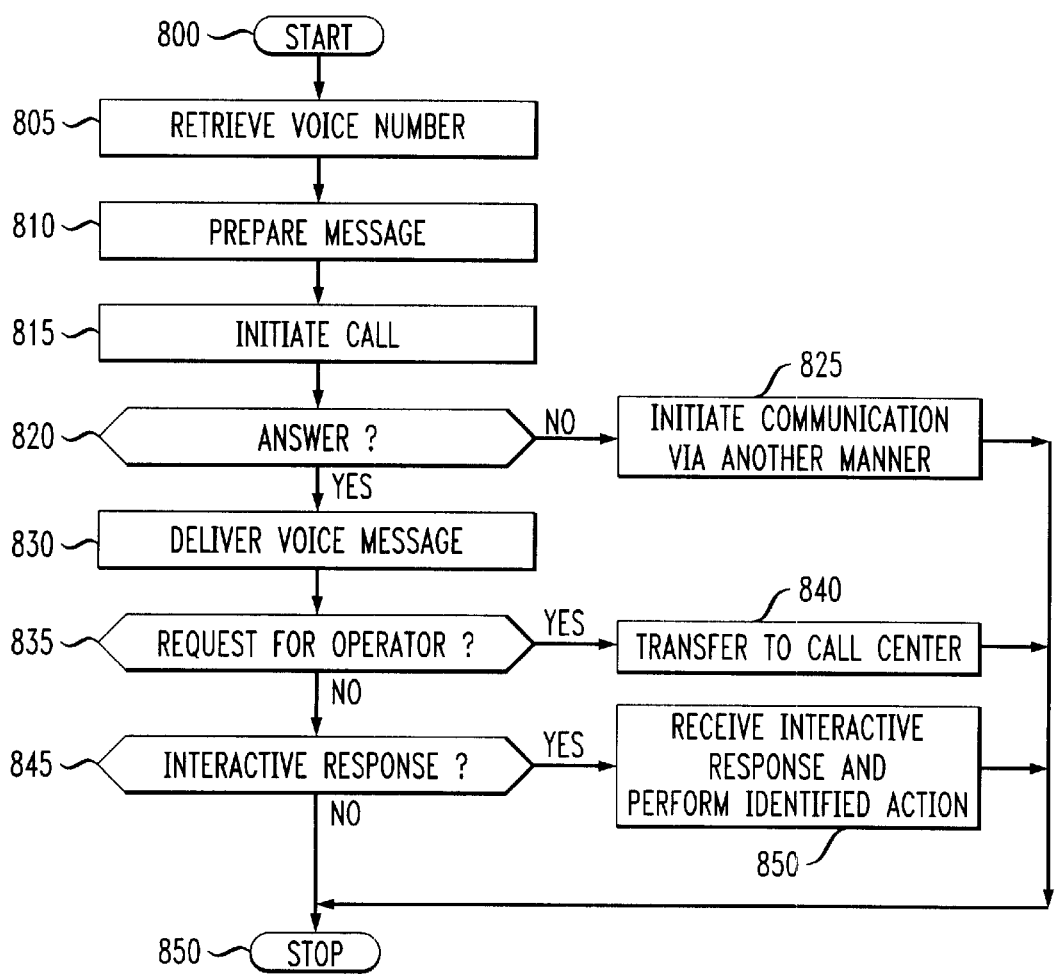
FIG. 8 is a flow diagram illustrating steps performed in providing notification via an interactive response system and call center.

Turning now to FIG. 8, illustrated is a flow diagram representing the steps performed by CMM 105 (FIG. 1) using an interactive voice response system and a call center. Processing begins with step 800. First, a voice number is retrieved which corresponds to the notification destination (step 805), the message is prepared (step 810), and the call is placed (step 815). If the phone is answered as determined in step 820, the voice message is delivered (step 830). If a request for an operator is received as determined at step 835 (e.g., a zero is depressed on the keypad by the customer), then the call is transferred to a call center as indicated by step 840. Otherwise, if there is any interactive voice response associated with this message as determined in step 845, then step 850 is performed to receive the interactive response and perform the action selected by the customer. Otherwise, processing ceases with step 860. If, in step 820, there was the called telephonic device is not answered, step 825 is performed to attempt to contact the customer via some other means (e.g., email, paging). Processing ceases with step 860.

In view of the many possible embodiments to which the principles of our invention may be applied, it will be appreciated that the embodiment described herein with respect to the drawing figures is only illustrative and should not be taken as limiting the scope of the invention. To the contrary, the invention as described herein contemplates all such embodiments as may come within the scope of the following claims and equivalents thereof.

What is claimed is:

1. A method of operating a customer message manager for notifying a set of subscribers of relevant changes in information, comprising the steps of:
   receiving a notification event from a real-time data system;
   determining a set of subscribers, said set comprising a plurality of subscribers, each of whom is assigned a subscriber level, selected from: a frequent flyer level, a ticket class, and a ticket price level, each of said subscribers being selected to receive data relating to said notification event; and
   initiating notification of said plurality of subscribers in said determined set of subscribers in an order of notification identified by said subscriber level assigned to each of said plurality of subscribers.

2. The method of operating a customer message manager of claim 1, further comprising the step of:
   providing a predetermined time delay between notification of the particular subscribers having different subscriber levels.

3. The method of operating a customer message manager of claim 1, further comprising the step of:
   providing said notification through at least one of: email, paging, a web site, automated voice synthesis, interactive voice response, and a call center.

4. The method of operating a customer message manager of claim 1, further comprising the steps of:
   receiving a subscriber response indicating a requested change to said real-time data system; and
   providing a change request to said real-time data system.

5. The method of operating a customer message manager of claim 4, further comprising the step of:
   providing a predetermined time delay between notification of the particular subscribers having different subscriber levels.

6. A method of operating a customer message manager for notifying customers of airline information, comprising the steps of:
   receiving a notification event from an airline system;
   determining a set of customers, said set comprising a plurality of customers, each of whom is assigned a customer level, selected from: a frequent flyer level, a ticket class, and a ticket price level, each of said customers being selected to receive data relating to said notification event; and
   initiating notification of said plurality of customers in said set of customers in an order of notification identified by said customer level comprising a frequent flyer level assigned to each of said plurality of customers.

7. The method of operating a customer message manager of claim 6, further comprising the step of:
   providing a predetermined time delay between notification of the particular customers having different frequent flyer levels.

8. The method of operating a customer message manager of claim 6, wherein the notification event is at least one of: a flight schedule event, a flight status event, a ticketing event, and a marketing event.

9. The method of operating a customer message manager of claim 6, further comprising the step of:
   providing said notification through at least one of: email, paging, a web site, automated voice synthesis, interactive voice response, and a call center.

10. A method of operating a customer message manager for notifying customers of airline information, comprising the steps of:
    receiving a notification event from an airline system;
    determining a set of customers, said set comprising a plurality of customers, each of whom is assigned a customer level, and each of whom are selected to receive data relating to said notification event; and
    initiating notification of said plurality of customers in said set of customers in an order of notification selected from a ticket price level, a ticket class, and a frequent flyer level identified with each of said plurality of customers.

11. The method of operating a customer message manager of claim 10, further comprising the step of:
    providing a predetermined time delay between notification of the particular customers having different ticket price levels or different classes of service.

12. The method of operating a customer message manager of claim 10, wherein the notification event is at least one of: a flight schedule event, a flight status event, a ticketing event, and a marketing event.

13. A method of operating a customer message manager for notifying customers of airline information, comprising the steps of:

polling an airline system to receive airline information;

evaluating said received airline information to generate a notification event;

determining a set of customers, said set comprising a plurality of customers, each of whom is assigned a customer level, and each of whom are selected to receive data relating to said notification event; and initiating notification of said plurality of customers in said set of customers in an order of notification selected from a frequent flyer level, a ticket price level, and a ticket class identified with each of said plurality of customers.

14. The method operating a customer message manager of claim 13, wherein said notification event comprises at least one of: a flight schedule event, a flight status event, a ticketing event, and a marketing event.

15. The method of operating a customer message manager of claim 13, further comprising the step of:

providing notification through at least one of: email, paging, a web site, automated voice synthesis, interactive voice response, and a call center.

16. A method of operating a customer message manager for notifying customers of airline information in response to a notification event and receiving a customer response for making a change to an airline system, comprising the steps of:

determining a set of customers, said set comprising a plurality of customers, each of whom is assigned a customer level, and each of whom are selected to receive data relating to a selected notification event;

initiating notification of said plurality of customers in said set of customers in an order of notification selected from: a frequent flyer level, a ticket price level, and a ticket class identified with each of said plurality of customers;

receiving a customer response from a one of said plurality of customers in said set of customers indicating a requested change to said airline system; and providing a change request to said airline system.

17. The method of operating a customer message manager of claim 16, further comprising the step of:

receiving said notification event from said airline system.

18. The method of operating a customer message manager of claim 16, further comprising the steps of:

polling an airline system to receive airline information; and evaluating said received airline information to generate a notification event.

19. The method of operating a customer message manager of claim 16, further comprising the step of:

initiating notification of said one customer associated with said change request whether said change request was accepted or denied.

20. The method of operating a customer message manager of claim 16, wherein said notification event comprises at least one of:

a flight schedule event, a flight status event, a ticketing event, and a marketing event.

* * * * *